Nov. 15, 1949     F. TURRETTINI     2,488,351
OPTICAL DEVICE FOR THE MEASUREMENT OF RELATIVE
DISPLACEMENTS OF A CARRIAGE
SLIDABLE ON A MACHINE-BED
Filed Jan. 31, 1948
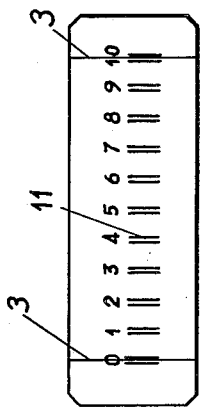
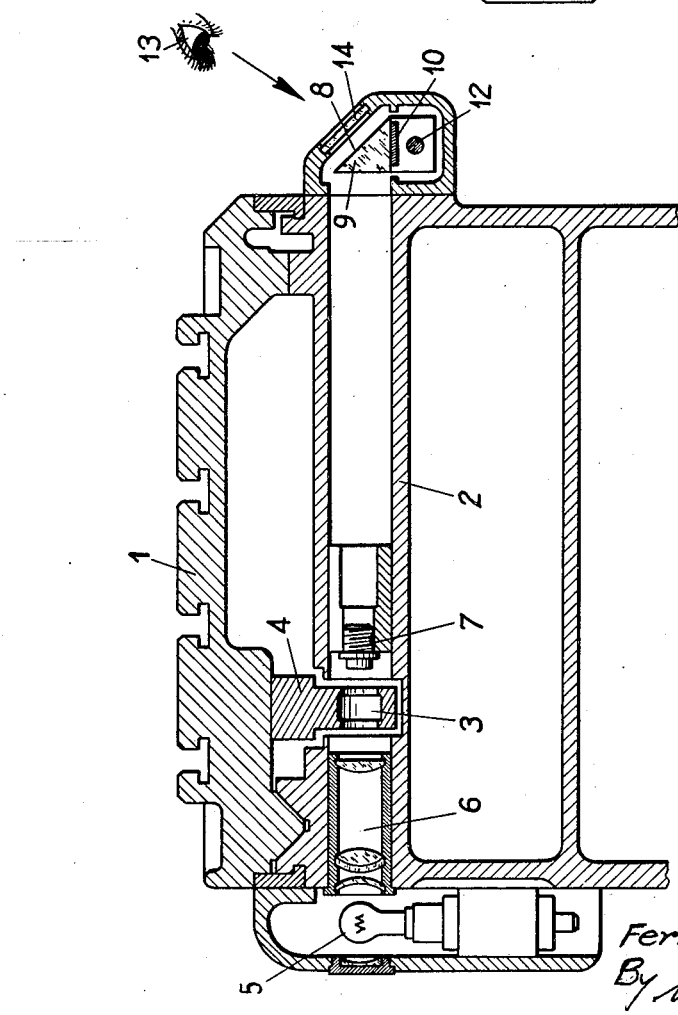
Inventor
Fernand Turrettini
By Robert E. Burns
Attorney Patented Nov. 15, 1949

2,488,351

UNITED STATES PATENT OFFICE 2,488,351

OPTICAL DEVICE FOR THE MEASUREMENT OF RELATIVE DISPLACEMENTS OF A CARRIAGE SLIDABLE ON A MACHINE BED

Fernand Turrettini, Geneva, Switzerland, assignor to the firm Societe Genevoise D'Instruments de Physique, Geneva, Switzerland, a firm of Switzerland Application January 31, 1948, Serial No. 5,544
In Switzerland February 19, 1947

1 Claim. (Cl. 88—24)

The invention relates to a device for the measurement of relative displacements of a carriage slidable on a machine bed, and more particularly for measuring the displacement of a work-table on the bed of a machine-tool.

It is an object of the invention to provide an optical measuring device enabling the operator to do his work with the least possible muscular fatigue and eye strain.

A feature of the invention resides in the provision of a projector by means of which a first graduation provided on the carriage is projected on enlarged scale onto an opaque screen mounted on the machine bed and adjustable thereon by micrometric means, said screen carrying a second graduation representing a division of the first one enlarged in the same scale and subdivided for fine measurements.

The invention will be more easily understood by referring to the attached drawing, showing, by way of example, an embodiment of the invention, and in which Fig. 1 is a longitudinal section of the measuring device across the machine bed, and Fig. 2 a plan view of the opaque screen.

In the embodiment shown, 1 is the work-table slidable on the machine bed 2. A graduated scale 3, secured below the table by a support 4, is assumed to be transparent. Its face carries spaced divisions, with 1 mm. spacing, for instance.

The lighting device comprises a lamp 5 and a condenser 6, and is arranged for projection of the division lines through the objective 7, and by means of the reflecting surface 8 of the prism 9, the projected image of the graduation is formed in a convenient magnification on the opaque screen 10.

This screen carries a graduation 11 which corresponds to an enlarged division of the graduation 3 and which is subdivided into ten equal parts. The screen 10 is movable longitudinally, in parallel direction to the scale 3, by means of a micrometric screw 12.

At the beginning of the measurement, the zero of the graduation of the screen is brought into coincidence (see Fig. 2) with the beginning of a subdivision of the magnified image of the scale 3 on the screen. The operator's eye shown at 13 can observe freely, through the window 14 and the reflecting face 8 of the prism 9, simultaneously the motionless screen and the movable image of the graduation of the scale 3.

This device avoids the eye strain which is often felt when using a microscope, and it reduces the necessary bodily movements and muscular fatigue of the operator, since the screen 14 can be easily observed from various positions.

What I claim is:

In an optic device for the measurement of relative displacements of a carriage slidable on a machine bed, a first graduated scale on said carriage, a light projector in said bed arranged for projecting light on said first scale, an opaque screen mounted on said bed with micrometric means enabling to move it longitudinally in a parallel direction to said first scale, an objective in said bed arranged for projecting the image of said first scale, conveniently enlarged, onto said opaque screen, a window in said bed for the free eye observation of said screen, a prism in said bed inserted between said window and said screen, a second scale on said screen corresponding to one division of enlarged image of said first scale, said second scale being a subdivision of said enlarged division, and both said enlarged first scale and second scale being visible simultaneously on said screen with the free eye, through said window and said prism.

FERNAND TURRETTINI.

REFERENCES CITED

The following references are of record in the file of this patent:

UNITED STATES PATENTS

| Number | Name | Date |
|---|---|---|
| 1,544,090 | Eppenstein | June 30, 1925 |
| 1,589,797 | Eppenstein | June 22, 1926 |
| 1,974,606 | Fassin | Sept. 25, 1934 |
| 2,302,572 | Reason | Nov. 17, 1942 |
| 2,422,611 | Becker et al. | June 17, 1947 |